B. O. RHODES.
UNIVERSAL JOINT.
APPLICATION FILED APR. 3, 1909. RENEWED MAY 22, 1912.
1,040,417.
Patented Oct. 8, 1912.
2 SHEETS—SHEET 1.
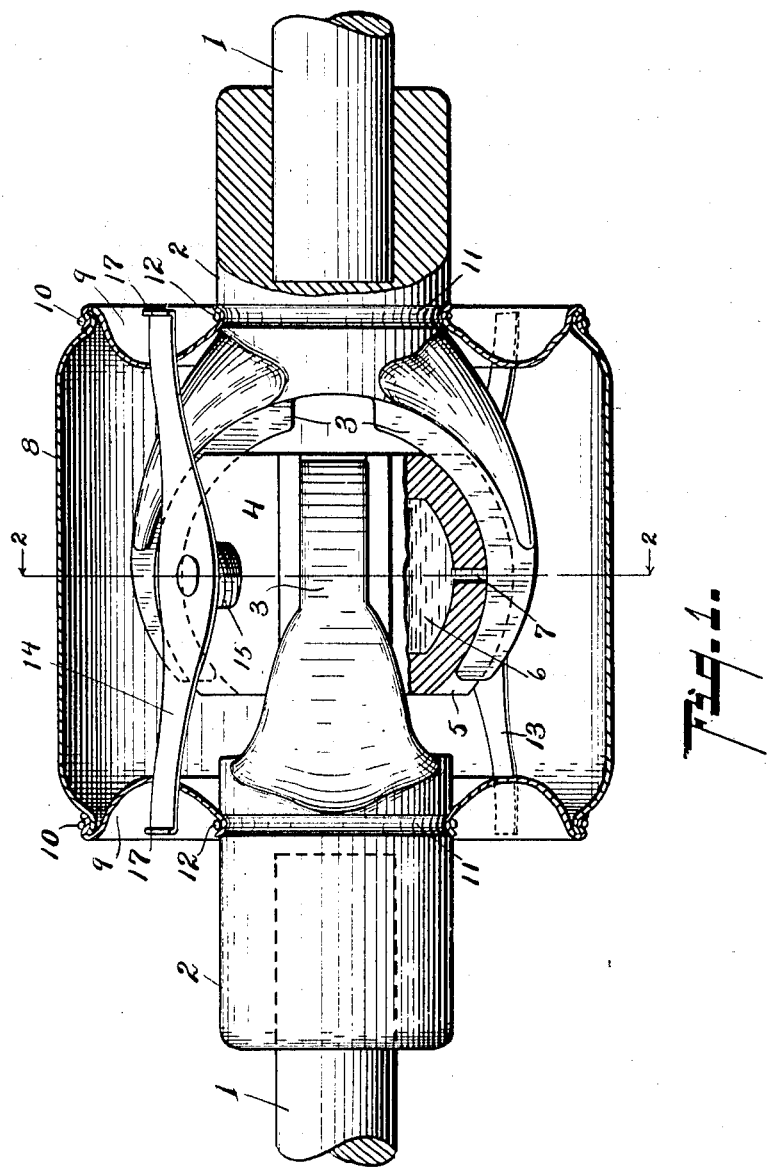

B. O. RHODES.
UNIVERSAL JOINT.
APPLICATION FILED APR. 3, 1909. RENEWED MAY 22, 1912.
1,040,417.
Patented Oct. 8, 1912.
2 SHEETS—SHEET 2.
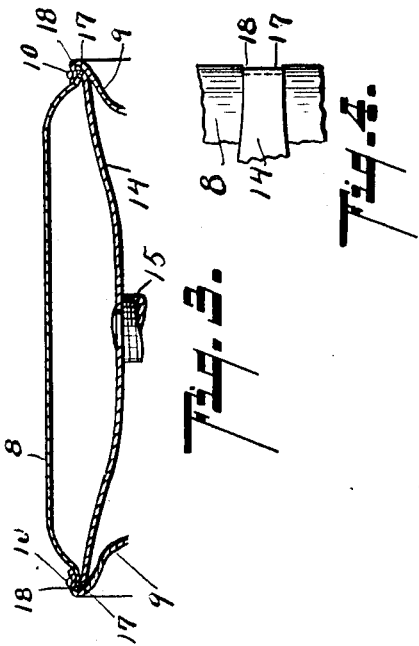
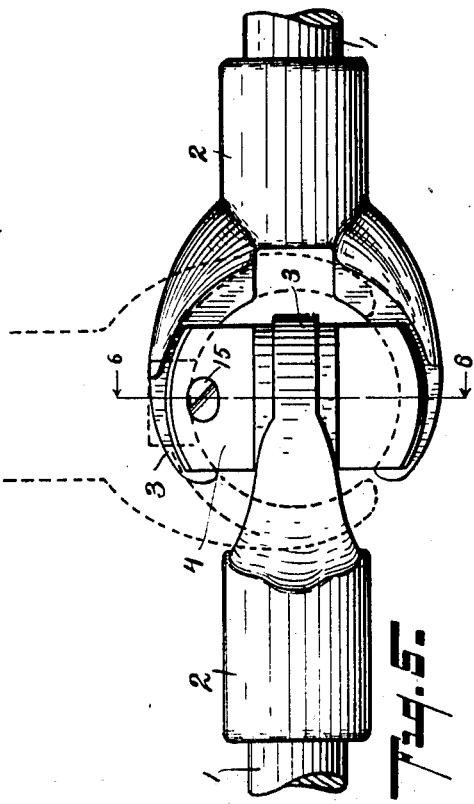
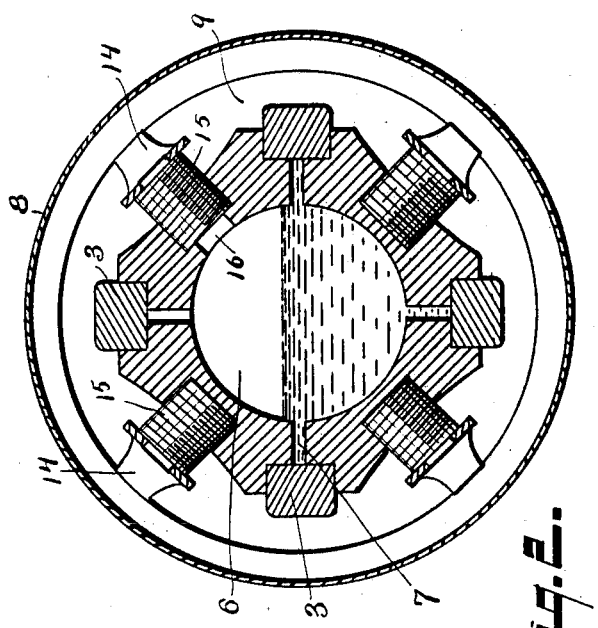
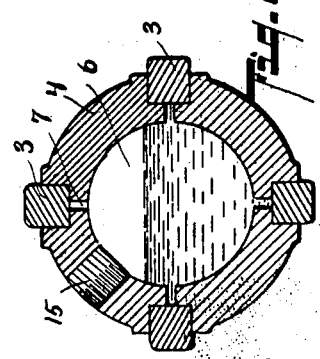
Witnesses
Elora Ellyn Braden
Gertrude Tallman
Inventor
Bert O. Rhodes
By Chappell Earl
Attorneys

UNITED STATES PATENT OFFICE.

BERT O. RHODES, OF KALAMAZOO, MICHIGAN.

UNIVERSAL JOINT.

1,040,417.   Specification of Letters Patent.   Patented Oct. 8, 1912.

Application filed April 3, 1909, Serial No. 487,704. Renewed May 22, 1912. Serial No. 699,071.

*To all whom it may concern:*

Be it known that I, BERT O. RHODES, a citizen of the United States, residing at the city of Kalamazoo, county of Kalamazoo, State of Michigan, have invented certain new and useful Improvements in Universal Joints, of which the following is a specification.

This invention relates to improvements in universal joints.

The main objects of this invention are: First, to provide an improved universal joint which is simple in structure and is, at the same time, very strong and durable. Second, to provide an improved universal joint in which the bearings are effectively lubricated. Third, to provide an improved universal joint in which the bearings are thoroughly protected from dust and dirt.

Further objects, and objects relating to structural details, will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawing, forming a part of this specification, in which:

Figure 1 is a detail side elevation with portions shown in longitudinal section, of a structure embodying the features of my invention. Fig. 2 is a transverse central section, taken on a line corresponding to line 2—2 of Fig. 1, with portions shown in full lines. Fig. 3 is a detail longitudinal section showing details of the supports for the casing. Fig. 4 is a detail showing details of the supporting means for the casing. Fig. 5 is a detail side elevation of a modified construction, the modification consisting of the omission of the outer casing, the manner of engaging the parts being illustrated by dotted lines. Fig. 6 is a transverse section taken on a line corresponding to line 6—6 of Fig. 5.

In the drawing, similar reference characters refer to similar parts throughout the several views, and the sectional views are taken looking in the direction of the little arrows at the ends of the section lines.

Referring to the drawing, 1—1 represents the shaft sections to be coupled. Each section is provided with a shaft member 2 having forked curved bearings 3 thereon, the arc of the bearing exceeding that of a half circle. The coupling member 4 for the shaft members is preferably block-like in form, and is provided with curved groove like bearings 5, arranged in oppositely disposed pairs, the radial plane of the bearings 5 for one shaft member being at right angles to the radial plane of the bearings for the other shaft member. The length of the coupling member 4 is less than the distance between the ends of the forked bearings 3 of the shaft members, so that the same may be engaged therewith when presented radially thereto, as is indicated by dotted lines in Fig. 5. The bearings of the shaft members are then swung into engagement with the bearings of the coupling member and are retained thereon owing to the shape of the bearings.

The coupling member is preferably chambered to form an oil reservoir 6, which is provided with an oil delivery opening 7 for each bearing 5. I preferably provide a casing, as is illustrated in Figs. 1 to 4, the casing comprising a shell-like body portion 8, connected to the shaft members. The casing portions 9 are preferably arranged over the end of the body 8 and are secured thereon by the securing wires 10, their inner edges being secured in the grooves 11 in the shaft member by means of the securing wires 12. This casing forms a dust excluder, and a lubricant retaining means for the coupling.

The casing is preferably supported by the spring retaining members 13 and 14, which are mounted on the studs 15 threaded into the coupling member 4. One of these studs serves as a closing plug for the supply opening 16 for the lubricant reservoir 6. The supporting member 14 is provided with outturned lugs 17 which engage suitable notches 18 in the ends of the body portion 8 of the casing, see Figs. 3 and 4. By this means, the casing is supported so that it can be readily removed as desired, and is very light in weight, its support adding very little to the weight of the coupling.

In the modified construction shown in Figs. 5 and 6, the casing is omitted.

My improved joint is very simple and economical in structure and strong and durable. It is also kept effectively lubricated. If desired, the lubricant may be placed within the outer casing. When the outer casing is used as a lubricant receptacle the lubricant reservoir 6 is not required.

I have illustrated and described my improved joint in detail in the form I have found practical in use. I am, however, aware that it is capable of considerable variation in structural details without departing from my invention, but as these structural modifications will be obvious to those skilled in the art to which this invention relates, I have not attempted to point them out herein, and I desire to be understood as claiming the structure specifically as illustrated, as well as the invention broadly.

Having thus described my invention, what I claim as new and desire to secure by Letters Patent, is:

1. In a universal joint, the combination of a pair of shaft members each having a curved fork bearing, the arc of which exceeds a half circle; a coupling member therefor having curved groove-like bearings for said bearings of said shaft members, the radial plane of the bearings for one shaft member being at a right angle to the radial plane of the bearings for the other, the length of said coupling member being less than the distance between the ends of said shaft bearings whereby the same may be engaged with the coupling member bearings when presented radially thereto, said coupling member being chambered to form an oil reservoir and having an oil opening for each of its said bearings; a casing comprising a shell-like body portion, the flexible portions connected to each end thereof and to said shaft members; and supporting members for said casing mounted on said coupling member.

2. In a universal joint, the combination of a pair of shaft members each having a curved forked bearing, the arc of which exceeds a half circle; a coupling member therefor having curved groove-like bearings for said bearings of said shaft members, said coupling member being chambered to form an oil reservoir and having an oil opening for each of its said bearings; a casing comprising a shell-like body portion, and flexible portions connected to each end thereof and to said shaft members; and supporting members for said casing mounted on said coupling member.

3. In a universal joint, the combination of a pair of shaft members each having a curved forked bearing, the arc of which exceeds a half circle; a coupling member therefor having curved groove-like bearings for said bearings of said shaft members; a casing comprising a shell-like body portion, the flexible portions connected to each end thereof and to said shaft members; and supporting members for said casing mounted on said coupling member, said casing supporting members being independent of the bearings of the joint.

4. In a universal joint, the combination of a pair of shaft members each having a curved forked bearing, the arc of which exceeds a half circle; a coupling member therefor having curved groove-like bearings for said bearings of said shaft members; a casing comprising a shell-like body portion, and flexible portions connected to each end thereof and to said shaft members; and supporting members for said casing mounted on said coupling member to engage said body of said casing, said shell supporting member being independent of the bearings of the joint.

5. In a universal joint, the combination of a pair of shaft members each having a curved forked bearing, the arc of which exceeds a half circle; a coupling member therefor having curved groove-like bearings for said bearings of said shaft members; a casing; and spring supporting members for said casing mounted on said coupling member.

6. In a universal joint, the combination of a pair of shaft members, each having a curved forked bearing, the arc of which exceeds a half circle; a coupling member therefor having curved groove-like bearings for the bearings of said shaft members; and a casing comprising a shell-like body portion and flexible portions connected to each end thereof and to said shaft members, said coupling member being provided with casing supporting members on which said shell-like body is removably mounted and said supporting members being independent of the shaft and coupling member bearings.

7. In a universal joint, the combination of a pair of shaft members, each having a curved forked bearing, the arc of which exceeds a half circle; a coupling member having curved groove-like bearings for said bearings of said shaft members, said shaft members being adapted to be engaged with said coupling member when presented radially thereto; and a casing comprising a shell-like body portion removably mounted on said coupling member, the supports for said casing being disposed on said coupling member between the said bearings thereof.

In witness whereof, I have hereunto set my hand and seal in the presence of two witnesses.

BERT O. RHODES. [L. S.]

Witnesses:
CLORA E. BRADEN,
GERTRUDE TALLMAN.